Aug. 11, 1936.  C. W. HANSON  2,050,319
TREATING METALLIFEROUS COMPOSITIONS OF COPPER, TIN, AND LEAD
Filed Jan. 14, 1935
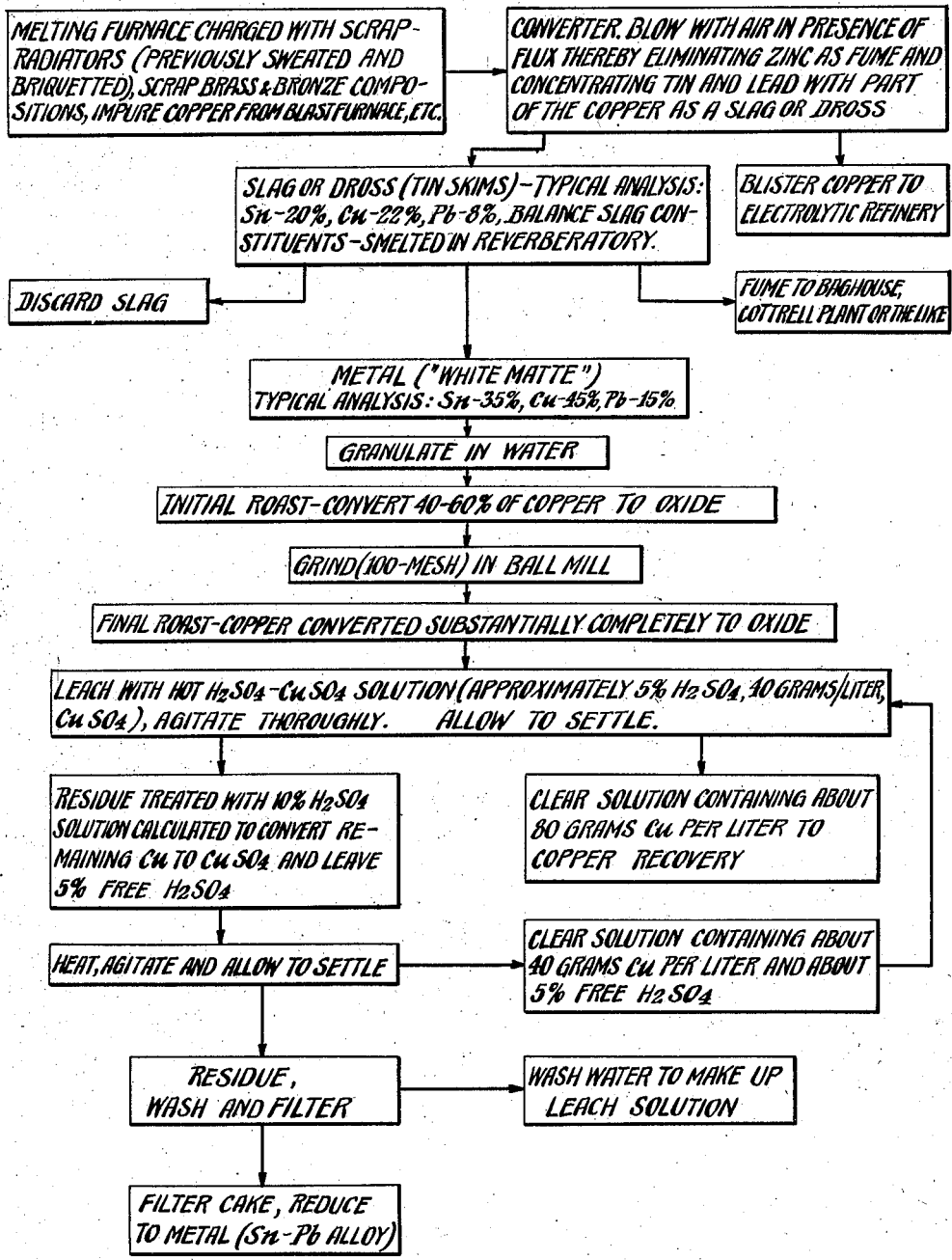
INVENTOR
Charles W. Hanson
BY James K. Kent
ATTORNEY Patented Aug. 11, 1936

2,050,319

UNITED STATES PATENT OFFICE 2,050,319

TREATING METALLIFEROUS COMPOSITIONS OF COPPER, TIN, AND LEAD

Charles W. Hanson, Plainfield, N. J., assignor to American Smelting and Refining Company, New York, N. Y., a corporation of New Jersey Application January 14, 1935, Serial No. 1,630

11 Claims. (Cl. 75—63)

This invention relates to the treatment of metalliferous materials in which copper, tin and lead predominate and particularly concerns a process for separating the copper and tin-lead contents of such materials and recovering these respective contents as valuable products.

A feature of the invention is the novel method by which copper is eliminated from compositions of this element with tin and lead leaving the latter in such a state that they may readily be marketed. Another feature is the improved preliminary treatment accorded the material for converting the copper to such form as will facilitate its ready extraction from the tin and lead.

Various other features and advantages of the invention will be apparent from the following description and from an inspection of the accompanying drawing which is a flow sheet illustrating the process.

The metalliferous materials which are amenable to treatment by the process of the invention may be derived from various sources. For example, in treating secondary products such as scrap radiators from internal combustion engines which carry substantial amounts of tin and lead, it is common practise to recover a portion of the solder by subjecting the scrap to a sweating process. However, a large amount of tin and lead remains associated with the scrap itself and therefore after sweating, the radiators may be briquetted and charged to a melting furnace. The material in this furnace may be appropriately augmented by various brass and bronze compositions, impure copper from the blast furnace containing tin, lead and minor amounts of other impurities, etc.

From the melting furnace, the material is sent to a converter and blown with air under a suitable flux, for example, soda ash, sand and fluorspar, by which action zinc is removed as fume and the tin and lead with substantial amounts of copper are transferred to the flux as slag or dross. A separation of the slag or dross from the remainder of the converter charge is then effected, the latter comprising blister copper being sent to the electrolytic refinery and the former being appropriately treated in a reverberatory furnace or otherwise smelted to yield a discard slag and a valuable copper-tin-lead product commonly termed "white matte".

This "white matte", which has a typical approximate analysis of 45% Cu, 35% Sn, 15% Pb and the balance various impurities in minor amounts, is well suited to treatment by the process of the invention although it will be understood that other compositions of copper, tin and lead derived from other sources and by different treatments from the specific one set forth above may be utilized with success.

In accordance with the invention the copper-tin-lead product, for example, "white matte" of a different or of the same analysis previously mentioned, is appropriately subdivided and subjected to a roasting treatment by which the copper content of the material is converted to soluble form. The product so prepared is then subjected to the action of a suitable solvent in a manner which extracts the copper leaving the tin and lead as a residue. Copper is appropriately recovered from the solution while the residue is readily smelted and refined to solder.

More specifically the invention may be practised as follows: converter tin skims analyzing, for example, 22% Cu, 20% Sn, 8% Pb and the balance slag forming elements, are smelted in a reverberatory furnace with coke and suitable flux which results in the formation of a discard slag, the elimination of zinc as fume and the production of metal which is the "white matte" above described.

The "white matte" is granulated in water, screened to one-half inch mesh and the smaller sizes charged to a roaster wherein a partial conversion, say, 40% to 60%, of the copper to cupric oxide is effected. An externally oil fired, multiple hearth roaster of the Wedge type is suitable for this purpose, same being equipped with a dryer and three roasting hearths provided respectively with four air-cooled rabble arms each and operated at a speed of approximately one R. P. M. A continuous hourly feeding rate of approximately 450 lbs. to 500 lbs. of the granulated material to the roaster has been found to work well in practise.

Following this initial or preliminary roasting operation, the partially roasted product is transferred to a suitable ball mill wherein it is ground to 100-mesh. In practise, a ball mill having a speed of approximately 28 R. P. M. and equipped with a classifier which returns oversizes to the mill has been successfully employed at a constant charging rate of approximately 500 lbs. to 550 lbs. of partially roasted product per hour.

The comminuted ball mill product is delivered to a second roaster, similar in construction to the first, in which the balance of the copper is oxidized thus yielding a fully roasted product in which substantially all of the copper is present as cupric oxide.

The completely roasted product is then sent to the leaching plant where the copper is extracted by counter current leaching with a suitable solvent, preferably sulphuric acid. This is done by first leaching the material with a solution containing copper and free solvent in quantity sufficient to dissolve a portion, say, two-thirds, of the copper thus yielding a copper solution containing no free solvent. As shown in the flow sheet this first leaching solution preferably comprises copper sulphate and approximately 5% free sulphuric acid. The leaching is carried out in conjunction with thorough agitation and preferably at a temperature of about 140° F. to 160° F. Following the leaching operation which normally requires from one and one-half to two hours, the solution is allowed to settle until clear. The clear solution containing, for example, 80 grams per liter of copper as copper sulphate and little or no free acid, is pumped from the tank, filtered and treated for the recovery of copper as by electrolysis or by precipitation as cement copper.

The residue is then further leached, the leaching solution in this instance having such solvent content that it will dissolve the remaining copper from the residue and still possess a free solvent content. As shown in the flow sheet the second leach solution may appropriately comprise a 10% sulphuric acid solution which upon completion of the leaching operation will comprise a copper sulphate-5% free sulphuric acid solution which is utilized as the initial solution for countercurrent leaching of further quantities of roasted material. The leaching of the residue as just described is effected under similar conditions of temperature, agitation, etc. as the first leach.

As a result of the above leaching operation, a residue is obtained which is practically free from copper and contains the tin and lead originally present in the material. The residue is washed with hot water, filter pressed and smelted to metal. Any small amounts of copper contained therein can be readily removed by any of the standard decopperizing processes employed in refining operations thus yielding the lead and tin as marketable solder.

From an operating standpoint it is desirable to maintain the concentrations of solvent (sulphuric acid) such that the initial leach solution will extract approximately two-thirds or more of the copper in the roasted material. Having regard to the copper content of any particular charge of roasted material, the concentration may be readily controlled by the addition of the proper amount of acid to the second leach solution either before using same or after its separation from the tin-lead residue.

For conducting the leaching operation, an installation comprising two units of three tanks each in which each tank is equipped with a steam heating coil and an agitator and in which a pump and pipe line are provided for each unit has proved satisfactory. The agitators may be suitably mounted to rotate at a speed of approximately 59 R. P. M. to approximately 82 R. P. M. and the tanks may conveniently be of 270 cu. ft. capacity. With such an installation a charge of approximately 3200 lbs. roasted material yielding 1700 lbs. to 1800 lbs. of dry cake is typically employed in practise.

While certain novel features of the invention have been disclosed and are pointed out in the annexed claims, it will be understood that various omissions, substitutions and changes may be made by those skilled in the art without departing from the spirit of the invention.

What is claimed is:

1. A process for treating "white matte" which comprises converting substantially the entire copper content of the matte to oxidized form, leaching the oxidized matte with a copper sulphate solution containing sufficient free sulphuric acid to dissolve a major portion of the copper, recovering copper from the resulting solution, leaching the partially leached residue with a second solution containing an excess of free sulphuric acid above that necessary to dissolve the remaining copper, utilizing the resulting copper sulphate-free sulphuric acid solution in the leaching of additional quantities of oxidized matte and treating the practically copper free leached residue for the recovery of its tin and lead contents.

2. A process for treating "white matte" which comprises subjecting said matte to a plurality of roasting operations thereby converting substantially the entire copper content of the matter to soluble form, dissolving the copper by subjecting the resulting product to a plurality of leaching steps, utilizing the solution from the last leaching step in the treatment of further quantities of roasted matte and smelting the insoluble residues remaining after the leaching operation to metal.

3. A process for refining "white matte" which comprises converting the copper content thereof to oxide form, dissolving the bulk of the copper by agitating the oxidized matte with a hot leaching solution having a predetermined sulphuric acid content, separating the resulting copper sulphate solution from the residue and recovering copper from the solution, agitating the residue with a second hot leaching solution having a sulphuric acid content in excess of that necessary to dissolve the remaining copper from the residue, reducing the residue of depleted copper content to metal and utilizing the leach solution containing free acid in the treatment of further portions of oxidized matte.

4. In refining "white matte" by oxidizing same and leaching the copper from the oxidizing matte, the improvement which comprises subjecting the matte to a plurality of oxidizing roasts and grinding the material intermediate said roasting operations.

5. The process for refining a tin-lead alloy containing copper which comprises subdividing said alloy, subjecting the subdivided alloy to a preliminary roast thereby oxidizing a substantial portion of the copper, grinding the partially roasted product, subjecting the ground product to a further roast until substantially all the copper has been oxidized, leaching the completely roasted product with a suitable solvent thereby dissolving the copper and smelting the residue to metal.

6. The process for treating compositions containing copper, lead and tin as major constituents which comprises granulating same, subjecting the granulated material to a preliminary roast, finely grinding the resulting product, subjecting the ground product to a final roast, leaching the finally roasted product in a plurality of steps, returning the solution from the last leaching step for treatment of additional quantities of completely roasted material, recovering copper from the initial leaching solution and reducing the insoluble residual material to form a tin-lead alloy.

7. The process for refining a tin-lead alloy containing copper which comprises subdividing said alloy, subjecting the subdivided alloy to a preliminary roast thereby oxidizing a substantial portion of the copper, comminuting the roasted product, subjecting the comminuted product to a further roast until substantially all the copper has been oxidized, leaching the completely roasted product with sulphuric acid thereby dissolving the copper, recovering copper from the leach solution and reducing the residue to metal.

8. A process for refining metalliferous materials in which copper, tin and lead predominate which comprises oxidizing the material to convert substantially the entire copper content to soluble form, leaching the material with a suitable solvent in such amounts that the resulting copper solution contains substantially no free solvent, separating said solution from the residual material, leaching said residual material with fresh solvent in such amount that substantially complete solution of copper is effected and an excess of free solvent remains in the solution, utilizing the copper solution containing free solvent in the leaching of fresh quantities of material containing copper in oxidized form and recovering metal substantially free from copper from the leached residue.

9. A process for refining metalliferous materials in which copper, tin and lead predominate which comprises subjecting the material to a plurality of roasts to convert substantially the entire copper content to oxidized form, leaching the material with a suitable solvent in such amounts that the resulting copper solution contains substantially no free solvent, separating said solution from the residual material, leaching said residual material with fresh solvent in such amounts that substantially complete solution of copper is effected and an excess of free solvent remains in the solution, utilizing the copper solution containing free solvent in the leaching of fresh quantities of material containing copper in oxidized form and recovering metal substantially free from copper from the leached residue.

10. The method of treating compositions of copper, tin and lead which comprises granulating the same, roasting the granulated product thereby partially converting the copper content thereof to cupric oxide, comminuting the partially roasted product, roasting the comminuted product thereby converting substantially all of the copper to cupric oxide, leaching the completely roasted product with a sulphuric acid-copper sulphate solution thereby producing a copper sulphate solution containing at most only a small amount of free sulphuric acid, separating said copper sulphate solution from insoluble residues, leaching said residues with sulphuric acid solution thereby dissolving substantially all the copper from said residues and yielding a sulphuric acid-copper sulphate solution, separating said solution from insoluble residues, utilizing said solution in the leaching of further quantities of roasted material and smelting the insoluble residues to metal.

11. The method of treating compositions of copper, tin and lead which comprises granulating the same, roasting the granulated product thereby partially converting the copper content thereof to cupric oxide, comminuting the partially roasted product, roasting the comminuted product thereby converting substantially all of the copper to cupric oxide, leaching the completely roasted product with a hot sulphuric acid-copper sulphate solution, separating the resulting copper sulphate solution from the residue with hot sulphuric acid solution thereby dissolving substantially all the copper from said residue and yielding a sulphuric acid-copper sulphate solution suitable for initial leaching of further quantities of roasted material, separating said solution from the residue and smelting the latter to metal.

CHAS. W. HANSON.